(12) United States Patent
Qian et al.

(10) Patent No.: US 11,952,547 B1
(45) Date of Patent: Apr. 9, 2024

(54) SELECTIVE DESULFURIZATION METHOD IMPLEMENTED BASED ON HIGH GRAVITY REACTOR

(71) Applicant: UNIVERSITY OF CHINESE ACADEMY OF SCIENCES, Beijing (CN)

(72) Inventors: Zhi Qian, Beijing (CN); Shao Wu, Beijing (CN)

(73) Assignee: University of Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/391,161

(22) Filed: Dec. 20, 2023

(30) Foreign Application Priority Data

Jun. 12, 2023 (CN) .......................... 202310687953.9

(51) Int. Cl.
*C10L 3/10* (2006.01)
*B01D 53/14* (2006.01)
*B01D 53/18* (2006.01)
*B01D 53/34* (2006.01)
*B01D 53/52* (2006.01)
*B01D 53/78* (2006.01)

(52) U.S. Cl.
CPC .......... *C10L 3/103* (2013.01); *B01D 53/1412* (2013.01); *B01D 53/1468* (2013.01); *B01D 53/1493* (2013.01); *B01D 53/185* (2013.01); *B01D 53/346* (2013.01); *B01D 53/52* (2013.01); *B01D 53/78* (2013.01); *B01D 2252/20405* (2013.01); *B01D 2252/20431* (2013.01); *B01D 2252/20489* (2013.01); *B01D 2257/304* (2013.01); *C10L 2290/541* (2013.01)

(58) Field of Classification Search
CPC ............ B01D 53/1412; B01D 53/1468; B01D 53/1493; B01D 53/185; B01D 53/346; B01D 53/52; B01D 53/78; C10L 2290/541
USPC ........................................................ 423/228
See application file for complete search history.

(56) References Cited

FOREIGN PATENT DOCUMENTS

| CN | 2654194 Y | 11/2004 |
|---|---|---|
| CN | 101549274 A | 10/2009 |

OTHER PUBLICATIONS

CN 2654194 Y English translation (Year: 2004).*
CN 101549274 A English translation (Year: 2009).*
(Continued)

*Primary Examiner* — Anita Nassiri-Motlagh
(74) *Attorney, Agent, or Firm* — Kinney & Lange, P.A.

(57) ABSTRACT

A selective desulfurization method implemented based on a high gravity reactor is provided, in the technical field of desulfurization separation. The selective desulfurization method includes the following steps: driving the packed bed to rotate through the driving device; introducing feed gas containing hydrogen sulfide into the reactor through the air inlet, and enabling the feed gas to enter the packed bed and move along a direction from a outer packing area of multiple areas to an inner packing area of the multiple of packing areas; introducing a desulfurizer into the packed bed through the liquid inlet, and enabling the desulfurizer to move along a direction from the inner packing area to the outer packing area under an action of centrifugal force. Deflectors can change the flow direction of the desulfurizer liquid after passing through the inner packing area.

16 Claims, 6 Drawing Sheets

(56) References Cited

OTHER PUBLICATIONS

English translation of first Chinese Office Action dated Jul. 15, 2023, for corresponding Chinese Application No. 202310687953.9.
Notification to Grant Patent Right for Invention dated Jul. 26, 2023, for corresponding Chinese Application No. 202310687953.9.

* cited by examiner

Drive the packed bed to rotate through the driving device

Introduce feed gas containing hydrogen sulfide into the reactor through the air inlet, and enable the feed gas to enter the packed bed and move along a direction from a outer packing area of the plurality of packing areas to an inner packing area of the plurality of packing areas; introduce a desulfurizer into the packed bed through the liquid inlet, and enable the desulfurizer to move along a direction from the inner packing area to the outer packing area under an action of centrifugal force

FIG. 3

SELECTIVE DESULFURIZATION METHOD IMPLEMENTED BASED ON HIGH GRAVITY REACTOR

CROSS-REFERENCE TO RELATED APPLICATION(S)

This patent application claims the benefit and priority of Chinese Patent Application No. 202310687953.9 filed with the China National Intellectual Property Administration on Jun. 12, 2023, the disclosure of which is incorporated by reference herein in its entirety as part of the present application.

TECHNICAL FIELD

The present disclosure relates to the technical field of desulfurization separation, in particular to a selective desulfurization method implemented based on a high gravity reactor.

BACKGROUND

In recent years, the proportion of high-quality, efficient and clean gas energy such as natural gas, coal gas and petroleum gas in the total energy consumption has been increased year by year. However, these fuel gas contain acid gases such as $H_2S$ (hydrogen sulfide) and $CO_2$ (carbon dioxide) in development/production process. $H_2S$ is high in toxicity and corrosiveness, and improper treatment can cause serious harm to the atmospheric environment and personal safety. In industrial processing, $H_2S$ can cause corrosion of equipment and pipelines, and may even lead to catalyst poisoning. In the process of desulfurization, particularly when other acid gases like $CO_2$ are present, the absorbent used to remove $H_2S$ can also absorb $CO_2$. This leads to a high co-absorption rate of both $H_2S$ and $CO_2$, which, in turn, results in a substantial increase in the circulating flow rate of the absorbent and escalates the energy required for the regeneration of absorbent. To mitigate these issues, it is crucial to remove $H_2S$ from the gas stream either before it progresses to subsequent stages or before its release into the environment. Achieving this effectively necessitates enhancing the selectivity towards $H_2S$ while minimizing the co-absorption of other acid gases like $CO_2$, as a means to promote energy conservation and reduce consumption.

The related technology discloses a method for extracting hydrogen sulfide from a raw gas with low hydrogen sulfide content, on offshore platform. In this method, the raw gas, with a hydrogen sulfide concentration of up to 300 ppm, is fed into a high gravity reactor from the side. The absorbent, entering from the center, is sprayed onto the packing's surface through a distributor. Within the reactor, the absorbent moves from the inner to the outer ring of the packing, while the gas flows in reverse, ensuring comprehensive interaction in the packing layer. This setup facilitates the transfer and absorption of hydrogen sulfide into the liquid phase, aided by amino groups in the absorbent, allowing the purified gas to exit directly from the reactor. However, in the above-mentioned method for extracting hydrogen sulfide from a raw gas with low hydrogen sulfide content on an offshore platform, a co-removal rate of carbon dioxide is high, resulting in reduced selectivity for hydrogen sulfide.

Consequently, there is a critical demand for a selective desulfurization method implemented based on a high gravity reactor, designed to effectively overcome the aforementioned challenges.

SUMMARY

The present disclosure provides an innovative method in selective desulfurization by expanding the end effect area of a high gravity reactor. This method is aimed at enhancing the mass transfer of feed gas containing hydrogen sulfide. By adopting this method, not only is the contact time between gas and liquid reduced, but the absorption of carbon dioxide is also minimized. Consequently, this leads to an improvement in the selectivity towards hydrogen sulfide.

The present disclosure provides a selective desulfurization method implemented based on a high gravity reactor. The high gravity reactor includes:
  a reactor having an inner chamber, provided with an air inlet, an air outlet, a liquid inlet and a liquid outlet;
  a packed bed including multiple packing areas, where an annular groove is arranged between each two adjacent packing areas, an inner edge area of each of the multiple packing areas forms an end effect area, the packed bed is arranged in the inner chamber of the reactor, the air inlet communicates with the packed bed, and the liquid inlet communicates with the packed bed;
  a guide module including multiple deflectors each being provided with a deflecting surface, the deflecting surface is configured for changing a flow direction of a desulfurizer liquid, and each annular groove is provided with several of the multiple deflectors annularly and uniformly arranged therein;
  a driving device configured for driving the packed bed to rotate.

The selective desulfurization method includes the following steps:
  driving the packed bed to rotate through the driving device;
  introducing feed gas containing hydrogen sulfide into the reactor through the air inlet, and enabling the feed gas to enter the packed bed and move along a direction from an outer packing area of the multiple packing areas to an inner packing area of the multiple packing areas; introducing a desulfurizer into the packed bed through the liquid inlet, and enabling the desulfurizer to move along a direction from the inner packing area to the outer packing area under an action of centrifugal force.

According to the selective desulfurization method implemented based on a high gravity reactor provided by the present disclosure, the high gravity reactor further includes a control module, a hydrogen sulfide detection device and a deflector driving module, the hydrogen sulfide detection device is configured for detecting a content of the hydrogen sulfide in the feed gas introduced into the reactor, the deflector driving module is configured for driving each of the multiple deflectors to rotate, and the driving device, the hydrogen sulfide detection device and the deflector driving module are in communication with the control module.

According to the selective desulfurization method implemented based on a high gravity reactor provided by the embodiment of the present disclosure also includes a feedback regulation control method, where the feedback regulation control method includes the following steps:
  presetting multiple numerical ranges of the content of the hydrogen sulfide;
  acquiring a data of the content of the hydrogen sulfide in the feed gas through the hydrogen sulfide detection device;

determining one of the multiple numerical ranges in which the acquired data of the content of the hydrogen sulfide falls; and adjusting a rotational speed of the driving device and a rotational angle of each of the multiple deflectors according to the one of the multiple numerical ranges in which the acquired data of the content of the hydrogen sulfide falls.

According to the selective desulfurization method implemented based on a high gravity reactor provided by the present disclosure, the multiple packing areas includes a first packing area and a second packing area, an inner diameter of the first packing area is 30 mm to 600 mm, and an outer diameter of the first packing area is 80 mm to 1800 mm; and an inner diameter of the second packing area is 100 mm to 2200 mm, and an outer diameter of the second packing area is 140 mm to 3200 mm.

According to the selective desulfurization method implemented based on a high gravity reactor provided by the present disclosure, a specific surface area of packing in the multiple packing areas is 200 $m^2/m^3$ to 1000 $m^2/m^3$.

According to the selective desulfurization method implemented based on a high gravity reactor provided by the present disclosure, a void ratio of packing in the multiple packing areas is 90% to 97%.

According to the selective desulfurization method implemented based on a high gravity reactor provided by the present disclosure, the rotational speed of the driving device is 200 r/min to 2000 r/min.

According to the selective desulfurization method implemented based on a high gravity reactor provided by the present disclosure, a flow rate of the introduced feed gas is 0.9 $m^3/h$ to 100000 $m^3/h$, and a flow rate of the introduced desulfurizer is 3 L/h to 500 $m^3/h$.

According to the selective desulfurization method implemented based on a high gravity reactor provided by the present disclosure, a desulfurization reaction temperature of the desulfurizer is less than or equal to 40° C.

According to the selective desulfurization method implemented based on a high gravity reactor provided by the present disclosure, the desulfurizer includes an MDEA (methyldiethanolamine) solution, a tannin extract solution, a PDS (binuclear cobalt phthalocyanine ammonium sulfonate) solution or a complex iron solution.

According to the selective desulfurization method implemented based on a high gravity reactor provided by some embodiments, multiple annular packing areas are arranged on the packed bed of the high gravity reactor, and multiple deflectors are uniformly arranged in the annular groove between the adjacent packing areas. In the process that the feed gas containing hydrogen sulfide flows in the direction from the outer packing area to the inner packing area, and in the process that the liquid desulfurizer flows in the direction from the inner packing area to the outer packing area under the action of centrifugal force applied by the driving device, the gas and liquid phases are in contact with each other. Deflectors can change the flow direction of desulfurizer liquid after passing through the inner packing area, so that multiple end effect areas are formed. Under the condition of reducing the packing volume, the mass transfer coefficient is further improved, and the gas-liquid contact time is reduced, so that the absorption of carbon dioxide is reduced, and the selectivity of hydrogen sulfide is further improved.

The additional aspects and advantages of the present disclosure will be set forth partially in the following description, and will be apparent from the following description, or learned through the practice of the present disclosure.

BRIEF DESCRIPTION OF THE DRAWINGS

In order to more clearly illustrate technical solutions in the embodiments of the present application or in the prior art, a brief introduction to the accompanying drawings will be provided below. Obviously, the accompanying drawings in the following description are only some of the embodiments of the present disclosure. Those of ordinary skill in the art would also be able to derive other drawings from these drawings without making creative efforts.

FIG. 3 is a schematic diagram of a selective desulfurization method implemented based on a high gravity reactor provided by an embodiment of the present disclosure.

Figure 1:
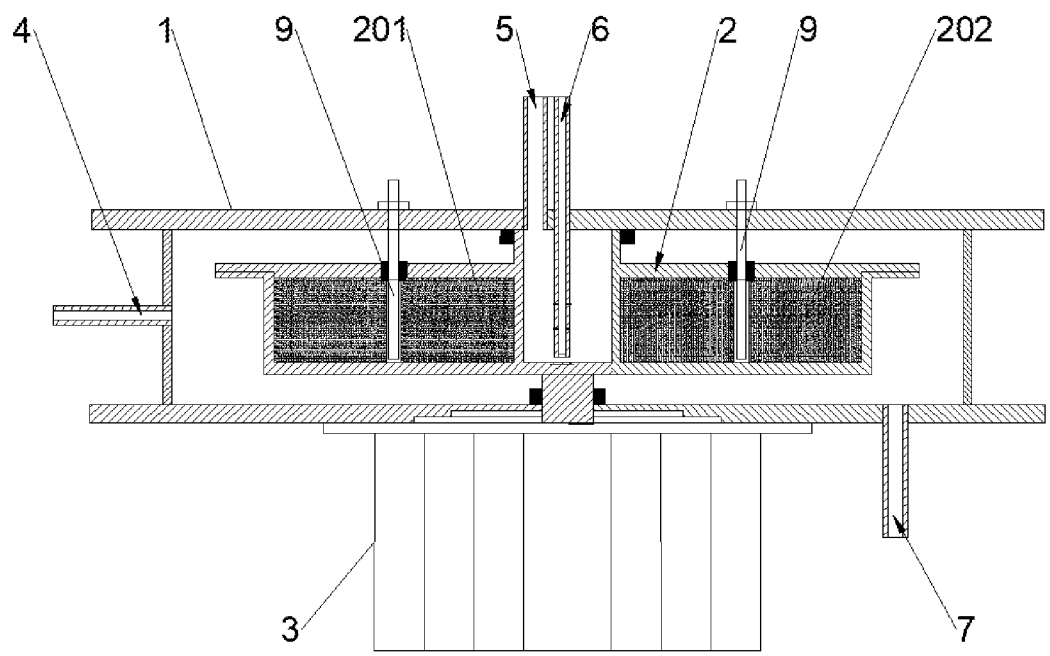
FIG. 1 is a schematic diagram of a high gravity reactor in a selective desulfurization method implemented based on a high gravity reactor provided by an embodiment of the present disclosure.

LIST OF REFERENCE NUMERALS 1 reactor; 2 packed bed; 201 first packing area; 202 second packing area; 3 driving device; 4 air inlet; 5 air outlet; 6 liquid inlet; 7 liquid outlet; 8 annular groove; 9 deflector; 901 fixed part; and 902 deflecting part.

DETAILED DESCRIPTION OF EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present invention, all other embodiments obtained by those of ordinary skill in the art without creative work shall fall within the protection scope of the present invention.

In combination with FIG. 1 to FIG. 7d, a selective desulfurization method implemented based on a high gravity reactor according to the present disclosure is described.

Figure 2:
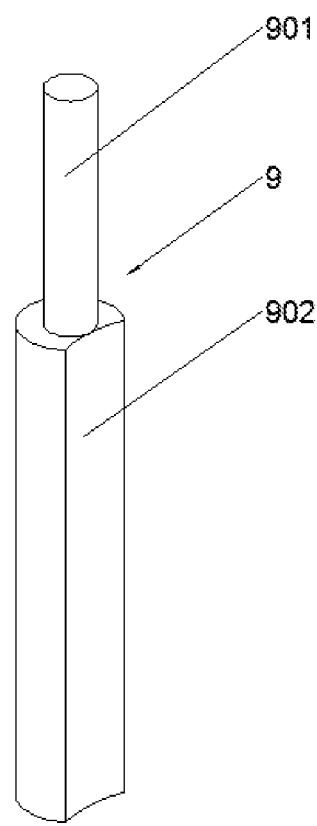
FIG. 2 is a schematic diagram of a deflector in a selective desulfurization method implemented based on a high gravity reactor provided by an embodiment of the present disclosure.

As shown in FIG. 1 and FIG. 2, the present disclosure provides a selective desulfurization method implemented based on a high gravity reactor.

The high gravity reactor includes a reactor 1, a packed bed 2, a guide module and a driving device 3. The reactor 1 has an inner chamber, and is provided with an air inlet 4, an air outlet 5, a liquid inlet 6 and a liquid outlet 7. The packed bed 2 includes a first packing area 201 and a second packing area 202. An annular groove 8 is arranged between the first packing area 201 and the second packing area 202. Inner edge areas of the first packing area 201 and the second packing area 202 form two end effect areas. The packed bed 2 is arranged in the inner chamber of the reactor 1. The air inlet 4 communicates with the packed bed 2, and the liquid inlet 6 communicates with the packed bed 2. The guide module includes multiple deflectors 9 provided with a deflecting surface. The deflecting surface is configured for changing the flow direction of desulfurizer liquid. Multiple the deflectors 9 are annularly and uniformly arranged in the annular groove 8. The driving device 3 is used for driving the packed bed 2 to rotate.

In the specific embodiment of the present disclosure, the deflector 9 is columnar and includes a fixed part 901 and a deflecting part 902. The fixed part 901 of the deflector 9 extends through an annular opening formed in the top wall of the packed bed 2 and a through hole formed in the top wall of the reactor 1. So that during the rotation of the packed bed 2, the annular opening formed in the top wall of the packed bed 2 can give place to the deflector 9 and prevent interference of a silo wall of the packed bed 2. The fixed part 901 of the deflector 9 is in normal running fit with the top wall of the reactor 1 to adjust the rotational angle of the deflector 9.

As shown in FIG. 3, in the specific embodiment of the present disclosure, the deflecting part 902 is columnar and made of stainless steel. The deflecting surface is arranged on the outer wall of the deflecting part 902. When the deflector 9 rotates, the angle of the deflecting surface also changes, so that different deflecting functions for the liquid desulfurizer are achieved.

In the specific embodiment of the present disclosure, the liquid desulfurizer can be uniformly sprayed to the inner edge of the first packing area 201 through a liquid distributor (not shown in FIG. 1). Specifically, the liquid distributor is a tubular part made of stainless steel, and small holes with the pore diameter of 1 mm are formed in the side facing the first packing area 201. The liquid desulfurizer is uniformly sprayed to the inner edge of the first packing area 201 through the small holes.

It can be predicted that in some embodiments, the packed bed 2 can also include two or more than two coaxially arranged packing areas. An annular groove 8 is formed between every two adjacent packing areas. Deflectors 9 are uniformly distributed in each annular groove 8, and more end effect areas can be formed, so that the mass transfer coefficient is further improved.

In the embodiment of the present disclosure, the selective desulfurization method includes the following steps:
driving the packed bed 2 to rotate through the driving device 3;
introducing feed gas containing hydrogen sulfide into the reactor 1 through the air inlet 4, and enabling the feed gas to enter the packed bed 2 and move along the direction from the second packing area 202 to the first packing area 201; introducing a desulfurizer into the packed bed 2 through the liquid inlet 6, and enabling the desulfurizer to move along the direction from the first packing area 201 to the second packing area 202 under the action of centrifugal force.

It should be noted that while the driving device 3 drives the packed bed 2 to rotate, the feed gas containing hydrogen sulfide and the desulfurizer are introduced.

In the selective desulfurization method implemented based on a high gravity reactor provided by the present disclosure, the feed gas containing hydrogen sulfide moves along the direction from the second packing area 202 to the first packing area 201 under the action of a differential pressure. The liquid desulfurizer can be uniformly sprayed to the inner edge of the first packing area 201 through the liquid distributor, and moves along the direction from the first packing area 201 to the second packing area 202 under the action of centrifugal force. The feed gas containing hydrogen sulfide and the liquid desulfurizer are in reverse contact with each other in gas and liquid phases respectively in the packed bed 2. Deflectors can change the flow direction of desulfurizer liquid after passing through the inner packing area, so that an end effect area is formed at the inner edge of the packing area. Under the condition of reducing the packing volume, the mass transfer coefficient is further improved, and the gas-liquid contact time is reduced, so that the absorption of carbon dioxide is reduced, and the selectivity of hydrogen sulfide is further improved. Acid gases (mainly hydrogen sulfide and carbon dioxide) in the feed gas containing hydrogen sulfide are dissolved in the liquid desulfurizer and react with the liquid desulfurizer. Desulfurization tail gas is absorbed by alkali liquor and then discharged into the atmosphere. The reacted liquid is thrown out of the packed bed 2 under the action of centrifugal force and collected on the inner wall of the reactor 1, and finally is discharged from the liquid outlet 7.

In the embodiment of the present disclosure, the high gravity reactor also includes a control module, a hydrogen sulfide detection device and a deflector driving module (not shown in FIG. 1). The hydrogen sulfide detection device is configured for detecting the content of hydrogen sulfide in the feed gas containing hydrogen sulfide introduced into the reactor 1. The deflector driving module is configured for driving each deflector 9 to rotate. The driving device 3, the hydrogen sulfide detection device and the deflector driving module are in communication with the control module. The concentration of hydrogen sulfide in the feed gas containing hydrogen sulfide can be detected in real time through the arrangement of the hydrogen sulfide detection device. The control module can send corresponding control signals to the deflector driving module and the driving device 3 according to current hydrogen sulfide concentration data. As an example, the deflector driving module can include multiple servo motors for driving the deflectors 9 to rotate, respectively. The control module can control each servo motor to operate synchronously or independently (to adjust the rotational angle of the deflector 9), so that the guide module is adapted to different operating conditions.

Figure 4:
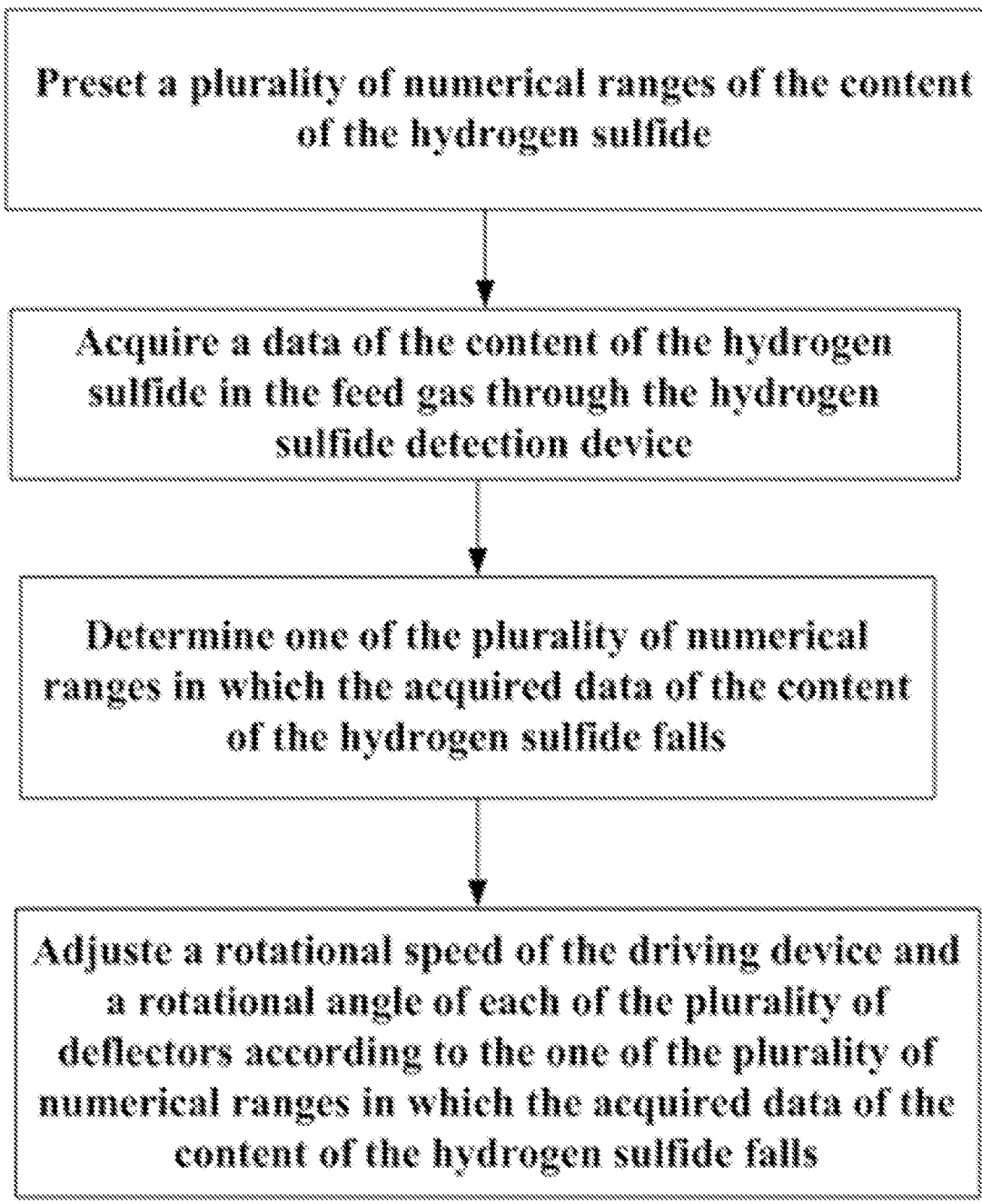
FIG. 4 is a schematic diagram of a feedback regulation method in a selective desulfurization method implemented based on a high gravity reactor provided by an embodiment of the present disclosure.

As shown in FIG. 4, the selective desulfurization method implemented based on a high gravity reactor provided by the embodiment of the present disclosure also includes a feedback regulation control method. The feedback regulation control method includes the following steps:
presetting multiple of numerical ranges of the content of the hydrogen sulfide;
acquiring a data of the content of the hydrogen sulfide in the feed gas through the hydrogen sulfide detection device;

determining one of the multiple numerical ranges in which the acquired data of the content of the hydrogen sulfide falls; and adjusting a rotational speed of the driving device and a rotational angle of each of the multiple deflectors according to the one of the multiple numerical ranges in which the acquired data of the content of the hydrogen sulfide falls.

As an example, the hydrogen sulfide content can be preset to be five numerical ranges of 200 ppm to 220 ppm, 220 ppm to 240 ppm, 240 ppm to 260 ppm, 260 ppm to 280 ppm, and 280 ppm to 300 ppm. For example, when the content data of hydrogen sulfide in the feed gas containing hydrogen sulfide acquired by the hydrogen sulfide detection device is 270 ppm, the content data falls into the numerical range of 260 ppm to 280 ppm. At this time, the control module can control the rotational speed of the driving device 3 and the rotational angle of each deflector 9 according to current working conditions. It should be noted that in general, the higher the concentration of the hydrogen sulfide in the feed gas containing hydrogen sulfide, the driving device 3 needs to drive the packed bed 2 to rotate at a higher operating speed within a certain rotating speed range of the packed bed 2 to achieve better desulfurization effect, and the energy consumption of the driving device 3 is high. Through the feedback regulation control method, the rotational angle of each deflector 9 can be adjusted according to the numerical ranges in which the concentration of hydrogen sulfide in the feed gas containing hydrogen sulfide falls. The mass transfer rate of the feed gas containing hydrogen sulfide and the liquid desulfurizer can be improved during the reverse contact process of the gas phase and the liquid phase in the packed bed 2, that is, the control module adjusts the rotational angle of each deflector 9, instead of the rotational speed adjustment of the driving device 3, to improve the desulfurization effect. So that the energy consumption is saved, and the balance between energy consumption and desulfurization efficiency is realized.

Figure 5:
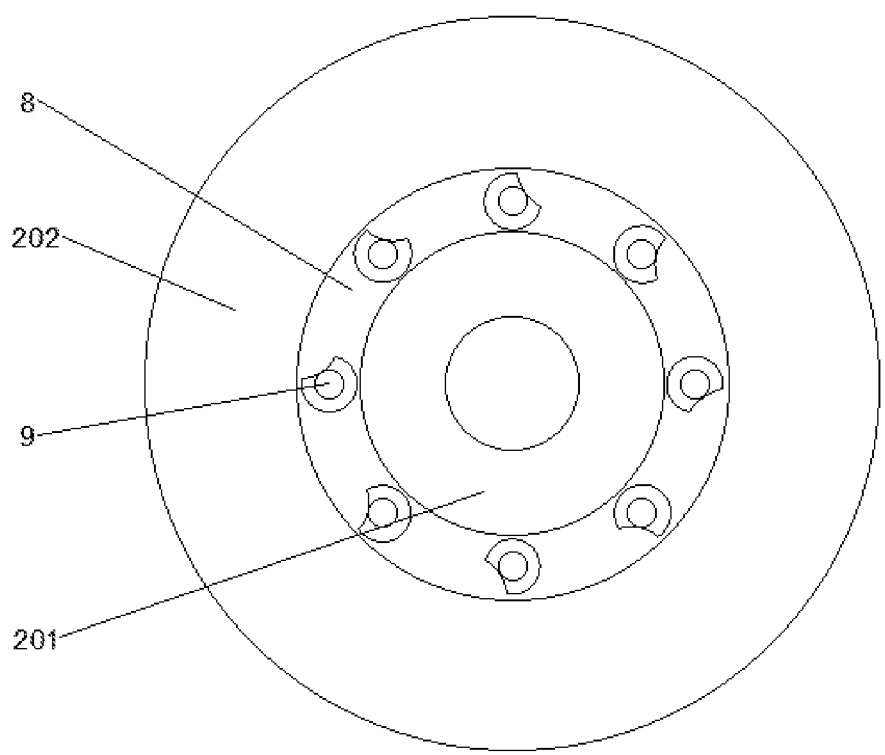
FIG. 5 is a schematic diagram of a first working mode of a guide module in a selective desulfurization method implemented based on a high gravity reactor provided by an embodiment of the present disclosure.
Figure 6:
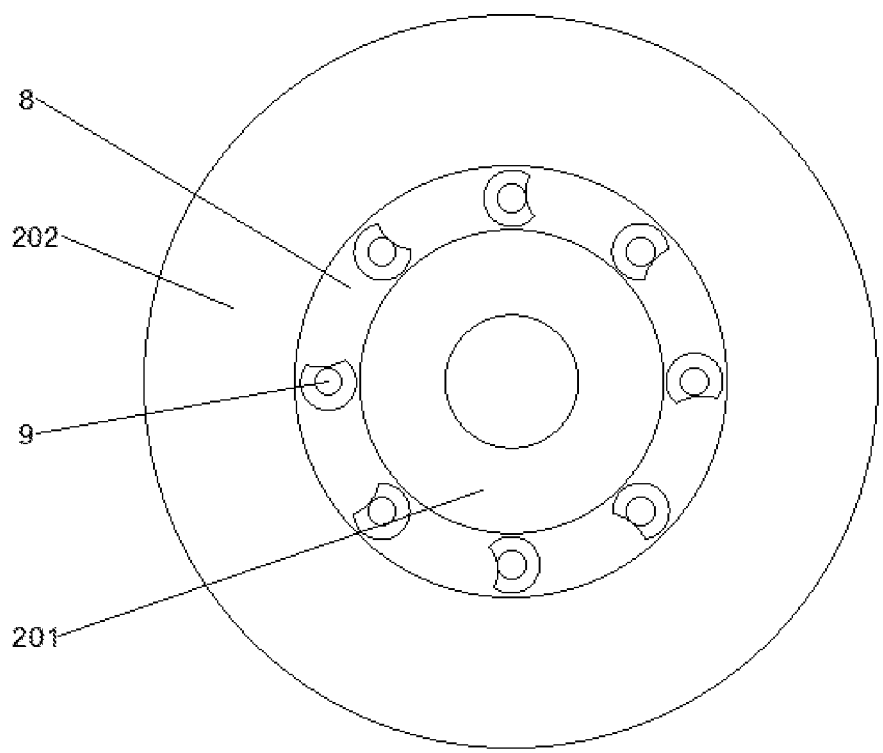
FIG. 6 is a schematic diagram of a second working mode of a guide module in a selective desulfurization method implemented based on a high gravity reactor provided by an embodiment of the present disclosure.
Figure 7A:
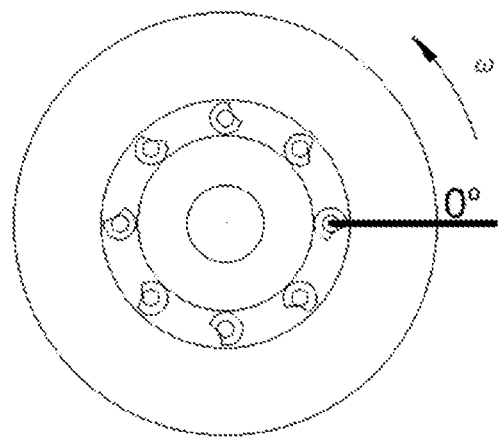
FIGS. 7a-7d are schematic diagrams of effective angle ranges of a deflector in a selective desulfurization method implemented based on a high gravity reactor provided by an embodiment of the present disclosure.
Figure 7B:
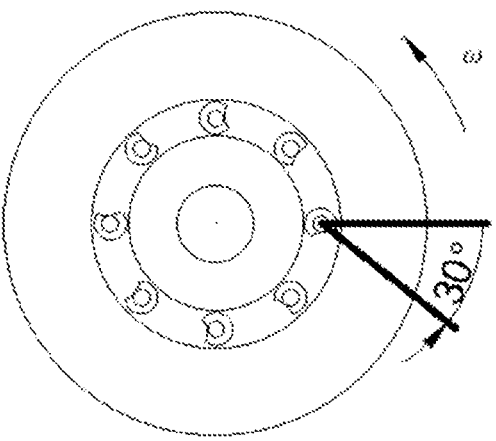
Figure 7C:
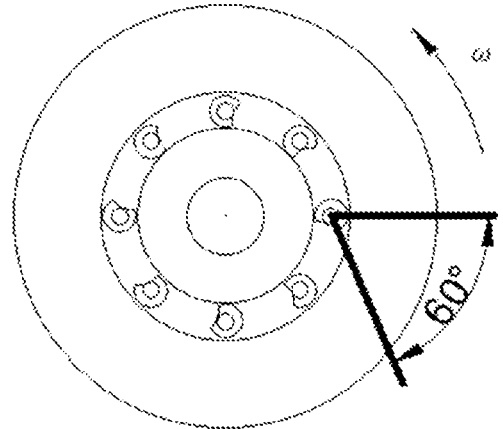
Figure 7D:
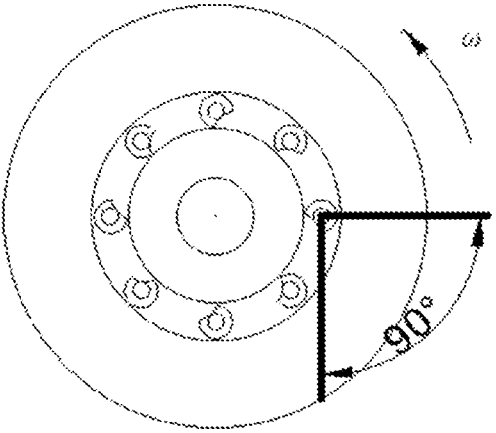

In some embodiments, multiple different working modes can be preset according to different numerical ranges. In each working mode, the deflection angle of each deflector 9 and the rotational speed of the driving device 3 are all set values. After the control module determines the numerical range in which the acquired content data of hydrogen sulfide falls, the corresponding working mode can be directly selected, as shown in FIG. 5 and FIG. 6. As shown in FIGS. 7a-7d, the effective rotational angle of the deflector 9 is −90° to 90° (−90° to 0° is not shown).

In the embodiment of the present disclosure, the inner diameter of the first packing area 201 is 30 mm to 600 mm, and the outer diameter of the first packing area 201 is 80 mm to 1800 mm; and the inner diameter of the second packing area 202 is 100 mm to 2200 mm, and the outer diameter of the second packing area 202 is 140 mm to 3200 mm. As an example, in view of an experiment, the inner diameter of the first packing area 201 is 30 mm to 50 mm, preferably 38 mm in the embodiment; the outer diameter of the first packing area 201 is 80 mm to 100 mm, preferably 90 mm in the embodiment; the inner diameter of the second packing area 202 is 100 mm to 140 mm, preferably 114 mm in the embodiment; the outer diameter of the second packing area 202 is 140 mm to 170 mm, preferably 146 mm in the embodiment. In view of industrial application, the inner diameter of the first packing area 201 is 400 mm to 600 mm, preferably 500 mm in the embodiment; the outer diameter of the first packing area 201 is 1500 mm to 1800 mm, preferably 1600 mm in the embodiment; the inner diameter of the second packing area 202 is 2000 mm to 2200 mm, preferably 2100 mm in the embodiment; the outer diameter of the second packing area 202 is 3000 mm to 3200 mm, preferably 3100 mm in the embodiment.

In the embodiment of the present disclosure, the specific surface area of packing is 200 $m^2/m^3$ to 1000 $m^2/m^3$, preferably 500 $m^2/m^3$ in the embodiment.

In the embodiment of the present disclosure, the void ratio of the packing is 90% to 97%, preferably 97% in the embodiment.

In the embodiment of the present disclosure, the rotational speed of the driving device 3 is 200 r/min to 2000 r/min, that is, the high gravity level of the driving device 3 is 2 to 200, preferably 1000 r/min to 1200 r/min (correspondingly, the high gravity level of the driving device 3 is 50 to 72). The desulfurization rate is increased with the increase of high gravity level, which is mainly because the high gravity level is increased, the surface renewal of a liquid film is accelerated, the turbulence degree of the liquid phase is improved, and the mass transfer between gas and liquid phases is strengthened. However, when the high gravity level of the packed bed 2 exceeds 72, the effect of the high gravity level on the removal rate is not obvious. The influence of the high gravity level on selectivity factor is that the selectivity factor is increased with the increase of the high gravity level before the high gravity level of the packed bed 2 reaches 72 and is decreased slightly with the increase of the high gravity level after the high gravity level of the packed bed 2 exceeds 72. The main reason is that the desulfurization rate is increased and the decarburization rate is decreased with the increase of the rotational speed within a low range of the high gravity level, while the selectivity factor is decreased with the increase of decarburization rate when the high gravity level exceeds 72. Therefore, considering the removal rate and selectivity factor comprehensively, the high gravity level should be controlled between 50 and 72, preferably.

In the embodiment of the present disclosure, the flow rate of the feed gas containing hydrogen sulfide is 0.9 $m^3/h$ to 100000 $m^3/h$, and the flow rate of the introduced desulfurizer is 3 L/h to 500 $m^3/h$. As an example, in view of an experiment, the flow rate of the feed gas containing hydrogen sulfide is 0.9 $m^3/h$ to 1.2 $m^3/h$, and the flow rate of the introduced desulfurizer is 3 L/h to 5 L/h. In view of industrial application, the flow rate of the feed gas containing hydrogen sulfide is 1000 $m^3/h$ to 100000 $m^3/h$, and the flow rate of the introduced desulfurizer is 100 $m^3/h$ to 500 $m^3/h$. Where, the influence of gas velocity on selectivity has the following rules. When the gas velocity is increased, the selectivity factor becomes larger. The main reason is that the influence of the gas velocity on the decarburization rate is greater than that on the desulfurization rate. When the gas velocity is larger, the residence time of the feed gas containing hydrogen sulfide in the packed bed 2 becomes shorter, so that the absorption of carbon dioxide is inhibited. Experimental results show that when the gas-liquid ratio is 200, the desulfurization rate exceeds 99.9%. At this time, the selectivity factor is 18-20, and is 20% higher than that of traditional high gravity equipment with a single ended effect area.

In the embodiment of the present disclosure, the desulfurization reaction temperature of the desulfurizer is less than or equal to 40° C. In the specific embodiment of the present disclosure, the desulfurizer is an MDEA solution (N-methyldiethanolamine solution, $C_5H_{13}NO_2$). In the process of absorbing hydrogen sulfide and carbon dioxide by MDEA, the influences of temperature on the process are as follows in the following aspects.

Firstly, the viscosity and other physical properties of the solution change with the temperature, and the temperature changes the equilibrium solubility in the desulfurizer solution, and then the mass transfer rate in the absorption process is affected, so that the removal rate of the hydrogen sulfide is decreased.

Secondly, because the reaction between MDEA and the hydrogen sulfide is instantaneous, the influence of temperature on the reaction rate is relatively small. But the reaction between MDEA and the carbon dioxide is slow, and the temperature has a great effect on the reaction rate, when the temperature rises, the reaction rate is increased obviously, and the co-absorption rate of the carbon dioxide is increased to cause the decrease of the selectivity factor.

Thirdly, for the desulfurizer solution, the influence of temperature on the absorption rate of the hydrogen sulfide is just opposite to that of the carbon dioxide. Low temperature is beneficial to the selective desulfurization. When the temperature exceeds 40° C., the decarburization rate is increased, but the desulfurization rate and the selectivity factor are decreased sharply.

Therefore, the method is carried out at normal temperature, and the temperature does not exceed 40° C.

Experimental results show that the selective desulfurization method implemented based on a high gravity reactor provided by the present disclosure operates at normal temperature, where the volume fraction of the hydrogen sulfide is 1% and the volume fraction of the carbon dioxide is 9%, the gas-liquid ratio is 200, the rotational speed of the driving device 3 is 1100 r/min, the removal rate of the hydrogen sulfide is 99.9%, the removal rate of the carbon dioxide is less than 4.99%, and the selectivity factor is 20.

In some embodiments of the present disclosure, the desulfurizer can also be tannin extract solution, PDS solution, or complex iron solution.

In the prior art, when rich liquid is regenerated, the content of the hydrogen sulfide in desorbed acid gas mixture (mainly hydrogen sulfide and carbon dioxide) is low, and cannot meet the standard and affects the Claus sulfur recovery process. Moreover, the energy consumption of desorption of acid gas mixture from amine solution is higher than that of pure hydrogen sulfide, so that the waste of energy is virtually increased. At present, the alcohol amine method is a common method to remove the hydrogen sulfide, and generally, sulfur-containing gas flow is absorbed in the tower. However, traditional tower equipment is too large, and has the defects of poor mass transfer effect, low removal efficiency and many by-products (acidic substances such as hydrochloric acid and thiosulfate). In addition, the longer gas-liquid contact time, larger packing volume and smaller gas-liquid ratio of a traditional tower are not obvious to improve the removal rate of hydrogen sulfide. On the contrary, these conditions are the main reasons for high removal rate and low selectivity. Therefore, in order to further improve the selectivity of the hydrogen sulfide, it is necessary to further improve the mass transfer effect, reduce the gas-liquid contact time and reduce the absorption of carbon dioxide. The expanding of the end effect areas of the high gravity equipment can effectively further improve the mass transfer, reduce the packing volume and reduce the gas-liquid contact time, and then the selectivity is further improved. The present disclosure provides a selective desulfurization method implemented based on a high gravity reactor to solve the above problems.

Compared with a packing tower and a traditional desulfurization technology of a high gravity reactor, the selective desulfurization method implemented based on a high gravity reactor provided by the present disclosure has the following advantages.

Firstly, the concentration of hydrogen sulfide in the air outlet 5 of the high gravity reactor in multiple end effect areas (taking the two end effect areas as an example, the same below) is 10 ppm to 20 ppm. The sulfur removal efficiency is high, and the removal rate of carbon dioxide can be inhibited. The co-absorption rate of the carbon dioxide is only about 5%, and the selectivity factor is high.

Secondly, the end-effect zone of the high gravity reactor with multiple end-effect zones is 40.7% longer than that of a traditional RPB (rotating packed bed), and the total mass transfer coefficient is increased by 18.5%.

Thirdly, the gas-liquid ratio of the high gravity reactor with the multiple end effect areas is large, and can reach more than 200.

Figure 8:
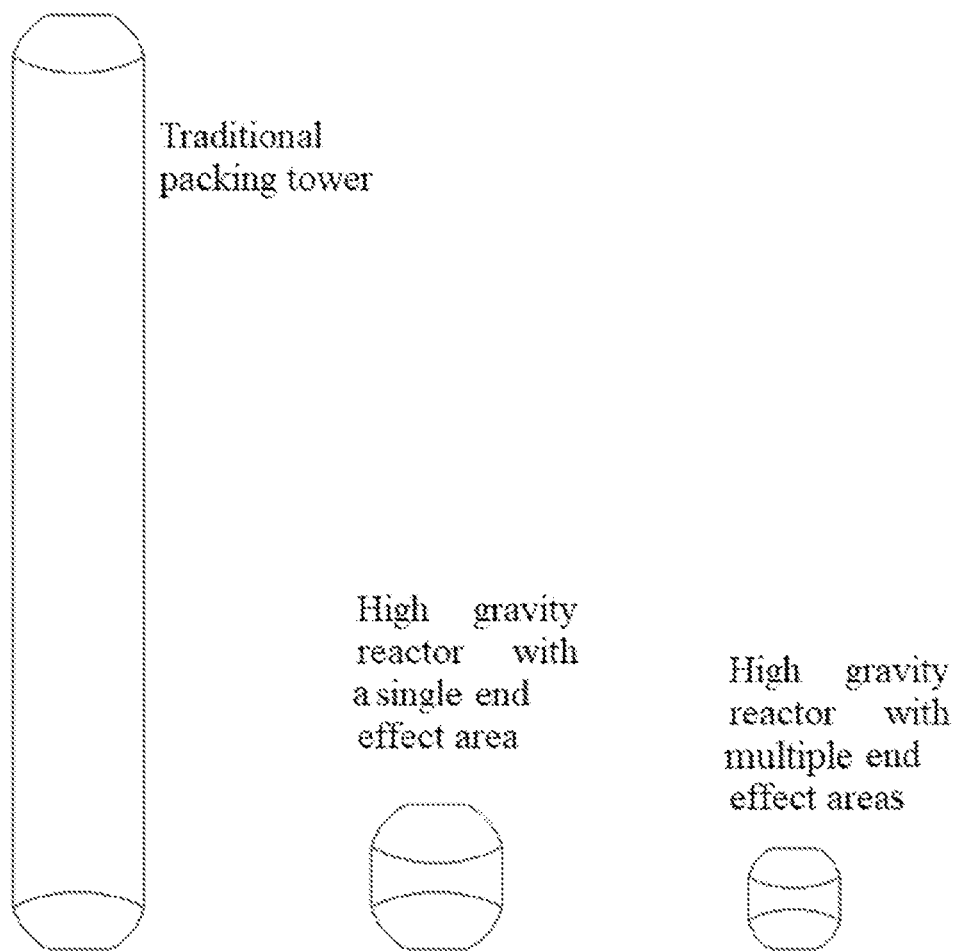
FIG. 8 is a schematic diagram of volume contrast between a high gravity reactor in a selective desulfurization method implemented based on a high gravity reactor provided by an embodiment of the present disclosure and a high gravity reactor and a packed tower in the prior art.

Fourthly, the volume of the high gravity reactor with the multiple end effect areas is small, and is about 65% of that of a traditional high gravity reactor with a single end effect area and only about 5% of that of the tower (as shown in FIG. 8).

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A selective desulfurization method implemented based on a high gravity reactor, wherein the high gravity reactor comprises:

a reactor having an inner chamber, and provided with an air inlet, an air outlet, a liquid inlet and a liquid outlet;

a packed bed comprising a plurality of packing areas, wherein an annular groove is arranged between each two adjacent packing areas, an inner edge area of each of the plurality of packing areas forms an end effect area, the packed bed is arranged in the inner chamber of the reactor, the air inlet communicates with the packed bed, and the liquid inlet communicates with the packed bed;

a guide module comprising a plurality of deflectors each being provided with a deflecting surface, the deflecting surface being configured for changing a flow direction of a desulfurizer liquid, wherein each annular groove is provided with several of the plurality of deflectors annularly and uniformly arranged therein; and a driving device configured for driving the packed bed to rotate;

wherein the selective desulfurization method comprises the following steps:

driving the packed bed to rotate through the driving device;

introducing feed gas containing hydrogen sulfide into the reactor through the air inlet, and enabling the feed gas to enter the packed bed and move along a direction from an outer packing area of the plurality of packing areas to an inner packing area of the plurality of packing areas; and introducing a desulfurizer into the packed bed through the liquid inlet, and enabling the desulfurizer to move along a direction from the inner packing area to the outer packing area under an action of centrifugal force, and wherein the high gravity reactor further comprises a control module, a hydrogen sulfide detection device and a deflector driving module, the hydrogen sulfide detection device is configured for detecting a content of the hydrogen sulfide in the feed gas introduced into the reactor, the deflector driving module is configured for driving each of the plurality of deflectors to rotate, and the driving device, the hydrogen sulfide detection device and the deflector driving module are in communication with the control module.

2. The selective desulfurization method implemented based on a high gravity reactor according to claim 1, further comprising a feedback regulation control method, wherein the feedback regulation control method comprises the following steps:

presetting a plurality of numerical ranges of the content of the hydrogen sulfide;

acquiring a data of the content of the hydrogen sulfide in the feed gas using the hydrogen sulfide detection device;

determining one of the plurality of numerical ranges in which the acquired data of the content of the hydrogen sulfide falls; and adjusting a rotational speed of the driving device and a rotational angle of each of the plurality of deflectors according to the one of the plurality of numerical ranges in which the acquired data of the content of the hydrogen sulfide falls.

3. The selective desulfurization method implemented based on a high gravity reactor according to claim 1, wherein:

the plurality of packing areas comprises a first packing area and a second packing area, an inner diameter of the first packing area is 30 mm to 600 mm, and an outer diameter of the first packing area is 80 mm to 1800 mm; and an inner diameter of the second packing area is 100 mm to 2200 mm, and an outer diameter of the second packing area is 140 mm to 3200 mm.

4. The selective desulfurization method implemented based on a high gravity reactor according to claim 1, wherein a specific surface area of packing in the plurality of packing areas is 200 $m^2/m^3$ to 1000 $m^2/m^3$.

5. The selective desulfurization method implemented based on a high gravity reactor according to claim 1, wherein a void ratio of packing in the plurality of packing areas is 90% to 97%.

6. The selective desulfurization method implemented based on a high gravity reactor according to claim 1, wherein a rotational speed of the driving device is 200 r/min to 2000 r/min.

7. The selective desulfurization method implemented based on a high gravity reactor according to claim 1, wherein a flow rate of the introduced feed gas is 0.9 $m^3/h$ to 100,000 $m^3/h$, and a flow rate of the introduced desulfurizer is 3 L/h to 500 $m^3/h$.

8. The selective desulfurization method implemented based on a high gravity reactor according to claim 1, wherein a desulfurization reaction temperature of the desulfurizer is less than or equal to 40° C.

9. The selective desulfurization method implemented based on a high gravity reactor according to claim 1, wherein the desulfurizer comprises an MDEA (methyldiethanolamine) solution, a tannin extract solution, a PDS (binuclear cobalt phthalocyanine ammonium sulfonate) solution or a complex iron solution.

10. The selective desulfurization method implemented based on a high gravity reactor according to claim 2, wherein:

the plurality of packing areas comprises a first packing area and a second packing area, an inner diameter of the first packing area is 30 mm to 600 mm, and an outer diameter of the first packing area is 80 mm to 1800 mm; and an inner diameter of the second packing area is 100 mm to 2200 mm, and an outer diameter of the second packing area is 140 mm to 3200 mm.

11. The selective desulfurization method implemented based on a high gravity reactor according to claim 2, wherein a specific surface area of packing in the plurality of packing areas is 200 $m^2/m^3$ to 1000 $m^2/m^3$.

12. The selective desulfurization method implemented based on a high gravity reactor according to claim 2, wherein a void ratio of packing in the plurality of packing areas is 90% to 97%.

13. The selective desulfurization method implemented based on a high gravity reactor according to claim 2, wherein a rotational speed of the driving device is 200 r/min to 2000 r/min.

14. The selective desulfurization method implemented based on a high gravity reactor according to claim 2, wherein a flow rate of the introduced feed gas is 0.9 $m^3/h$ to 100,000 $m^3/h$, and a flow rate of the introduced desulfurizer is 3 L/h to 500 $m^3/h$.

15. The selective desulfurization method implemented based on a high gravity reactor according to claim 2, wherein a desulfurization reaction temperature of the desulfurizer is less than or equal to 40° C.

16. The selective desulfurization method implemented based on a high gravity reactor according to claim 2, wherein the desulfurizer comprises an MDEA (methyldiethanolamine) solution, a tannin extract solution, a PDS (binuclear cobalt phthalocyanine ammonium sulfonate) solution or a complex iron solution.

\* \* \* \* \*